US010731564B2

(12) United States Patent
Terauchi et al.

(10) Patent No.: US 10,731,564 B2
(45) Date of Patent: Aug. 4, 2020

(54) TRANSITION STRUCTURE

(71) Applicant: KAWASAKI JUKOGYO KABUSHIKI KAISHA, Kobe-shi, Hyogo (JP)

(72) Inventors: Koji Terauchi, Kobe (JP); Kiyoshi Matsumoto, Kobe (JP); Katsuhiro Yokoji, Kobe (JP)

(73) Assignee: KAWASAKI JUKOGYO KABUSHIKI KAISHA, Kobe-shi, Hyogo (JP)

( * ) Notice: Subject to any disclaimer, the term of this patent is extended or adjusted under 35 U.S.C. 154(b) by 121 days.

(21) Appl. No.: 15/778,670

(22) PCT Filed: Sep. 27, 2016

(86) PCT No.: PCT/JP2016/004353
§ 371 (c)(1),
(2) Date: May 24, 2018

(87) PCT Pub. No.: WO2017/090221
PCT Pub. Date: Jun. 1, 2017

(65) Prior Publication Data
US 2018/0355799 A1 Dec. 13, 2018

(30) Foreign Application Priority Data

Nov. 26, 2015 (JP) ................. 2015-230238

(51) Int. Cl.
| *F01D 9/00* | (2006.01) |
| *F02C 7/20* | (2006.01) |
| *F02C 7/18* | (2006.01) |
| *F02C 7/28* | (2006.01) |
| *F23R 3/42* | (2006.01) |
| *F01D 9/02* | (2006.01) |
| *F23R 3/60* | (2006.01) |

(52) U.S. Cl.
CPC ............... *F02C 7/20* (2013.01); *F01D 9/023* (2013.01); *F02C 7/18* (2013.01); *F02C 7/28* (2013.01); *F23R 3/42* (2013.01); *F23R 3/60* (2013.01); *F05D 2220/32* (2013.01); *F05D 2260/232* (2013.01); *F05D 2260/30* (2013.01)

(58) Field of Classification Search
CPC ............... F23R 3/60; F02C 7/20; F01D 9/023
See application file for complete search history.

(56) References Cited

U.S. PATENT DOCUMENTS 5,706,646 A    1/1998  Wilde et al.

FOREIGN PATENT DOCUMENTS

| EP | 743424 | * 11/1996 |
| JP | 8-312376 A | 11/1996 |
| JP | 4174615 B2 | 11/2008 |

OTHER PUBLICATIONS

International Search Report for PCT/JP2016/004353 dated Dec. 20, 2016.

* cited by examiner

*Primary Examiner* — Gerald L Sung
(74) *Attorney, Agent, or Firm* — Sughrue Mion, PLLC (57) ABSTRACT

A transition structure between a combustor and a turbine in a gas turbine includes: a transition piece including a duct and a flange protruding from a downstream end of the duct; and a piece cover surrounding the duct. The piece cover includes a boss that is fixed to the turbine by a bolt in a state where the flange is sandwiched between the boss and the turbine.

7 Claims, 6 Drawing Sheets

TRANSITION STRUCTURE

CROSS REFERENCE TO RELATED APPLICATIONS

This application is a National Stage of International Application No. PCT/JP2016/004353 filed Sep. 27, 2016, claiming priority based on Japanese Patent Application No. 2015-230238 filed Nov. 26, 2015.

TECHNICAL FIELD

The present invention relates to a transition structure between a combustor and a turbine in a gas turbine.

BACKGROUND ART

In a gas turbine, a transition piece is provided between a combustor and a turbine. For example, Patent Literature 1 discloses a transition structure as shown in FIG. 6.

Figure 6:
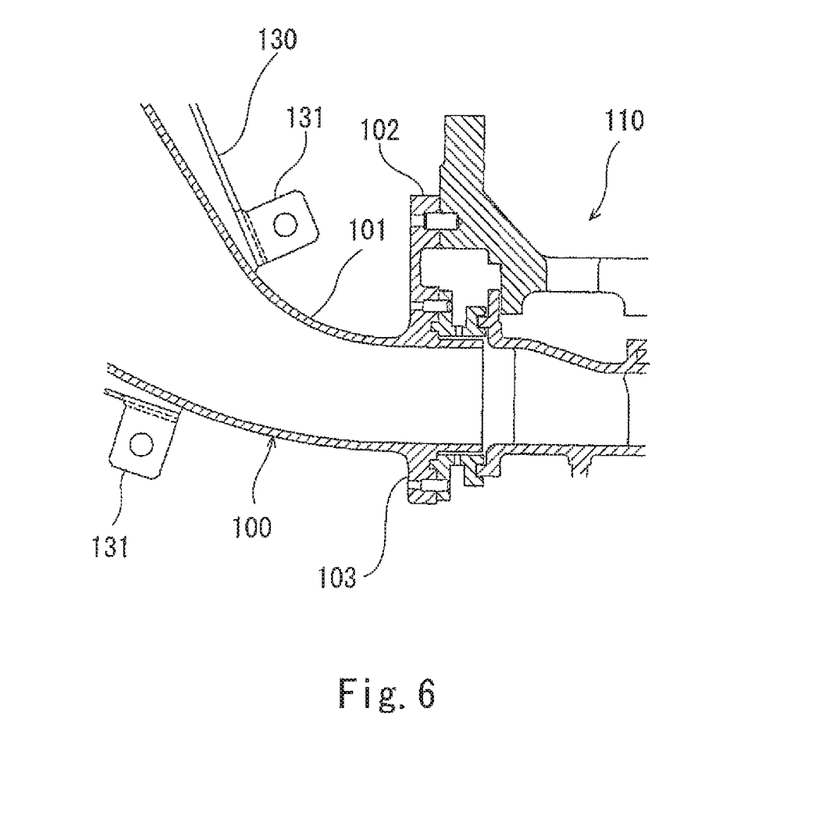
FIG. 6 is a sectional view of a conventional transition structure.

In the transition structure shown in FIG. 6, a transition piece 100 includes: a duct 101 including a circular inlet and an arc-shaped outlet; and an outer flange 102 and an inner flange 103, which protrude from the downstream end of the duct 101. The outer flange 102 is fixed to a turbine 110 by unshown bolts.

The duct 101 of the transition piece 100 is surrounded by a piece cover 130. The piece cover 130 is provided with bosses 131 intended for fixing the piece cover 130 to the duct 101. The bosses 131 are fixed to lugs (not shown) provided on the duct 101 by unshown bolts.

CITATION LIST

Patent Literature

PTL 1: Japanese Patent No. 4174615

SUMMARY OF INVENTION

Technical Problem

In the transition structure shown in FIG. 6, the piece cover 130 is fixed to the duct 101 by bolts, and the transition piece 100 is fixed to the turbine 110 by other bolts. In such a structure, a large number of bolts are used. Therefore, the work of assembling such a structure is time consuming.

In view of the above, an object of the present invention is to provide a transition structure that makes it possible to simplify the assembling work.

Solution to Problem

In order to solve the above-described problems, a transition structure according to the present invention is a transition structure between a combustor and a turbine in a gas turbine, and the transition structure includes: a transition piece including a duct and a flange protruding from a downstream end of the duct; and a piece cover surrounding the duct. The piece cover includes a boss that is fixed to the turbine by a bolt in a state where the flange is sandwiched between the boss and the turbine.

According to the above configuration, the transition piece and the piece cover are fixed to the turbine by the same bolt. This makes it possible to simplify the assembling work.

The boss may be in contact with the turbine over the flange. According to this configuration, the height of the flange of the transition piece can be made low such that the flange does not reach the bolt, and thus the flange can be made small in size. In addition, since the flange is covered by the boss, blowing of compressed air discharged from a compressor against the flange is reduced. Consequently, cooling of the flange by the compressed air is suppressed, and thereby thermal stress occurring at the root portion of the flange can be reduced.

The turbine may include: a turbine nozzle including a nozzle flange; a nozzle support that supports the nozzle flange; and an adapter interposed between the nozzle flange and the flange of the transition piece such that the adapter is in surface contact with the nozzle flange and the flange of the transition piece, and interposed between the nozzle support and the boss such that the adapter is in surface contact with the nozzle support and the boss, the adapter being ring-shaped around a central axis of the turbine. According to this configuration, high sealing performance can be obtained at both sides of the adapter.

The bolt may penetrate the nozzle support and the adapter. According to this configuration, the axial force of the bolt can be applied between the adapter and each of the flange of the transition piece and the boss, and also between the adapter and each of the nozzle flange and the nozzle support. This makes it possible to obtain higher sealing performance at both sides of the adapter.

The flange of the transition piece may be positioned upstream of an arc-shaped outlet of the duct. The adapter may face an arc wall of the duct, the arc wall being positioned at an external diameter side or an internal diameter side of the arc-shaped outlet. The adapter may be provided with a cooling hole that penetrates the adapter in a radial direction. According to this configuration, the duct can be cooled even at the downstream side of the flange of the transition piece by using the compressed air discharged from the compressor.

For example, the flange of the transition piece may be at least one of an outer flange and an inner flange, the outer flange protruding from the downstream end of the duct to an external diameter side of the arc-shaped outlet, the inner flange protruding from the downstream end of the duct to an internal diameter side of the arc-shaped outlet.

Advantageous Effects of Invention

According to the present invention, the assembling work of the transition structure can be simplified.

DESCRIPTION OF EMBODIMENTS

Figure 1:
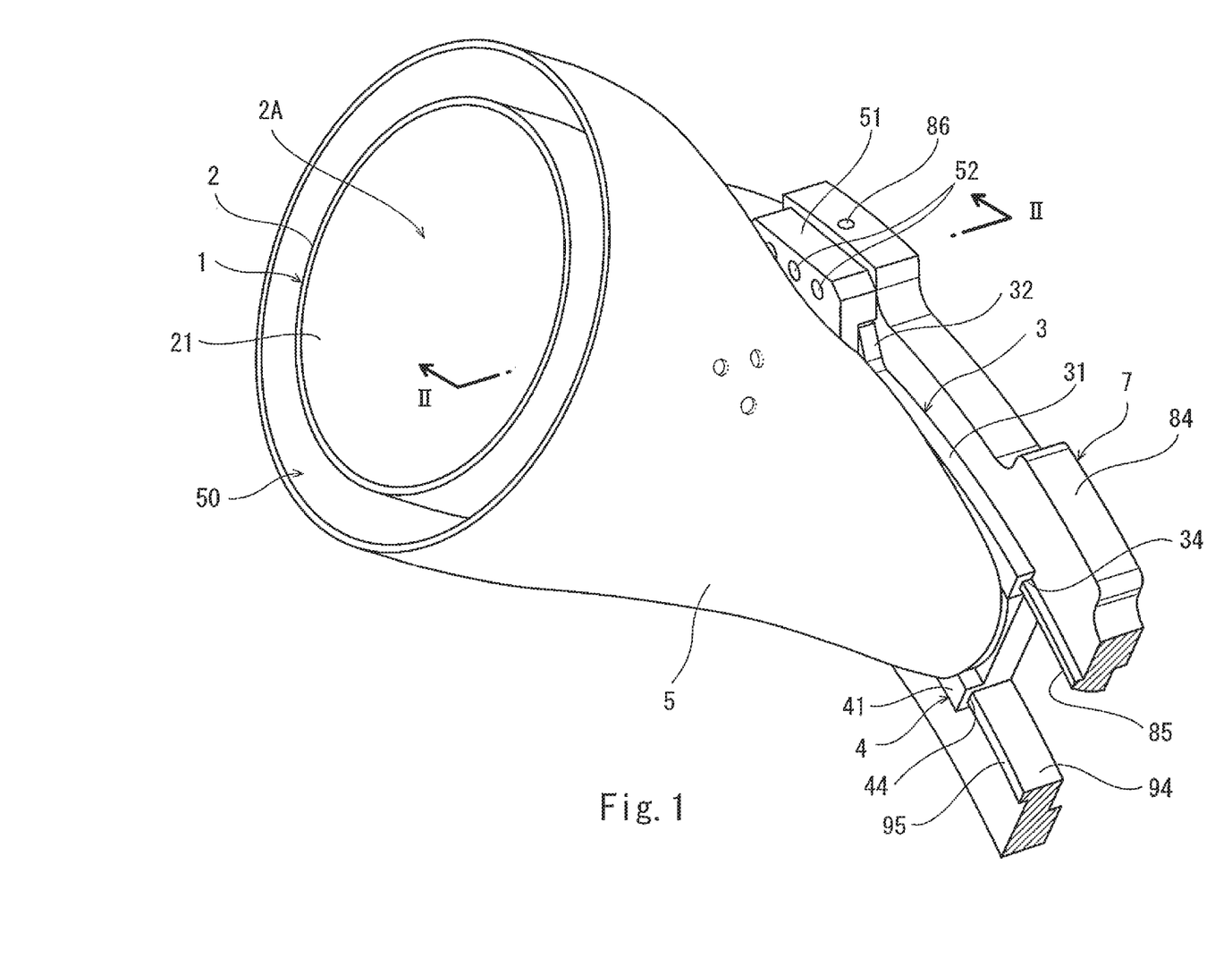
FIG. 1 is a perspective view of a transition structure according to one embodiment of the present invention.
Figure 2:
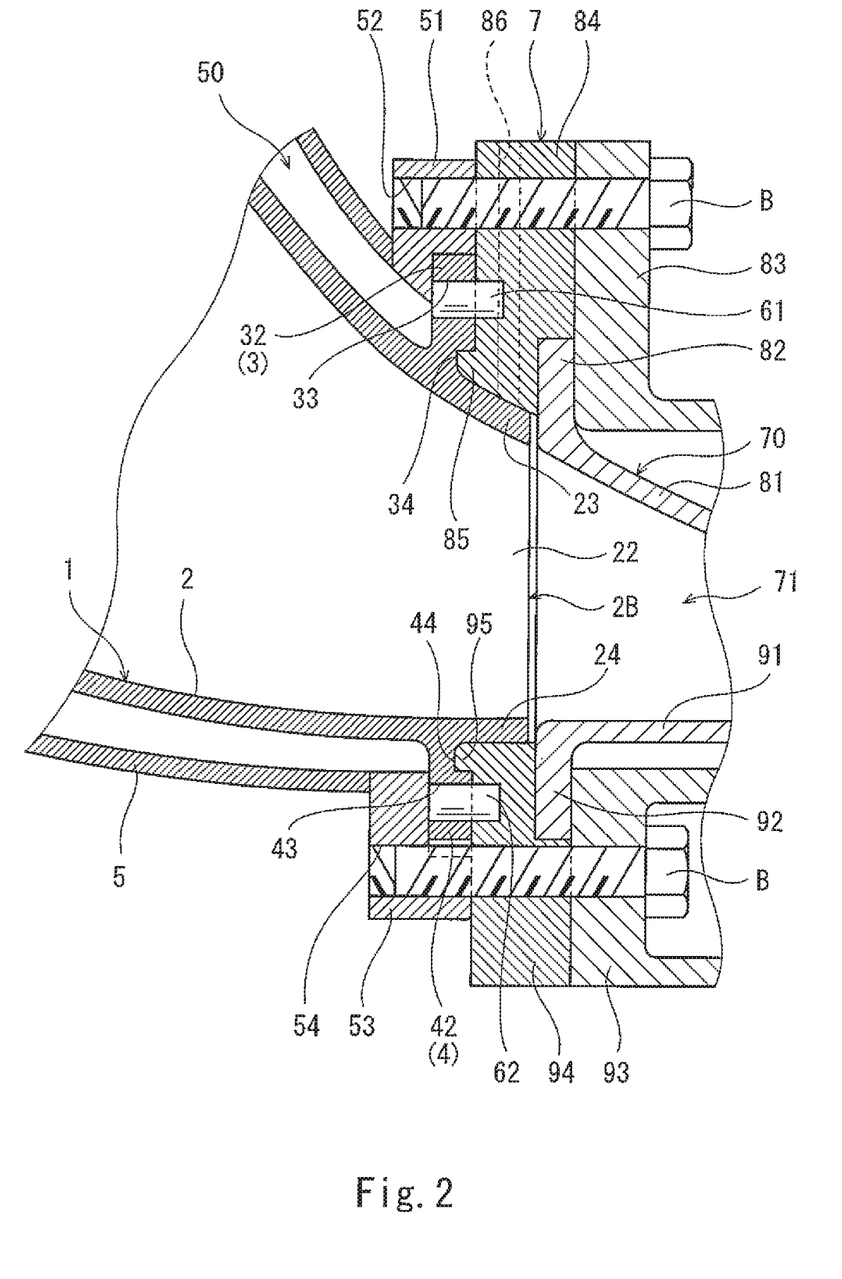
FIG. 2 is a sectional view taken along line II-II of FIG. 1.

FIG. 1 and FIG. 2 show a transition structure between a combustor (not shown) and a turbine 7 in a gas turbine according to one embodiment of the present invention. In the gas turbine, compressed air is discharged from a compressor (not shown) into a convention chamber provided between the compressor and the turbine 7. A plurality of combustors are provided around the compressor in a manner to protrude from the convention chamber. The transition structure is provided between the turbine 7 and each combustor. In other words, the number of transition structures is equal to the number of combustors.

The turbine 7 includes multi-stage turbine nozzles forming an annular gas passage 71. Among the multi-stage turbine nozzles, FIG. 2 shows only a first-stage turbine nozzle 70, which is disposed most upstream among the multi-stage turbine nozzles.

Each transition structure includes a transition piece 1, which connects between the corresponding combustor and the first-stage turbine nozzle 70. To be more specific, the transition piece 1 includes a duct 2, which allows a discharge outlet of the combustor and the gas passage 71 of the turbine 7 to be in communication with each other.

The duct 2 of the transition piece 1 is surrounded by a piece cover 5, and the combustor is surrounded by a combustor cover. An air passage 50 is formed between the duct 2 of the transition piece 1 and the piece cover 5, and between the combustor and the combustor cover (not shown). The piece cover 5 is provided with a large number of holes (in FIG. 1 and FIG. 4, only three holes representing the large number of holes are shown) for introducing compressed gas into the air passage 50 and cooling the duct 2 by impingement cooling.

The compressed air discharged into the aforementioned convention chamber is introduced into the air passage 50 through the large number of holes formed in the piece cover, and flows to an air inlet of the combustor. The compressed air is taken into the combustor through the air inlet, and mixed with a fuel in the combustor. Thereafter, the resulting air-fuel mixture is combusted, and thereby combustion gas is generated. The combustion gas flows from the discharge outlet of the combustor to the gas passage 71 of the turbine 7 through the duct 2 of the transition piece 1.

The turbine 7 includes: an outer nozzle support 83 and an outer adapter 84, which are positioned outside the first-stage turbine nozzle 70; and an inner nozzle support 93 and an inner adapter 94, which are positioned inside the turbine nozzle 70.

The first-stage turbine nozzle 70 of the turbine 7 includes an outer shroud 81 and an inner shroud 91, which are spaced apart from each other with the gas passage 71 positioned therebetween. In the present embodiment, the turbine nozzle 70 is divided into a plurality of segments, which are arranged in the circumferential direction. In each segment, the outer shroud 81 and the inner shroud 91 are coupled together by an unshown strut.

The front end of the outer shroud 81 is provided with a nozzle flange 82, which spreads radially outward. The outer nozzle support 83 is in surface contact with the nozzle flange 82 at the rear of the nozzle flange 82, and supports the nozzle flange 82. The outer adapter 84 is a ring-shaped member disposed at the front of the nozzle flange 82 and the outer nozzle support 83, and the outer adapter 84 is ring-shaped around the central axis of the turbine 7. The outer adapter 84 is in surface contact with the nozzle flange 82 and the outer nozzle support 83.

Similarly, the front end of the inner shroud 91 is provided with a nozzle flange 92, which spreads radially inward. The inner nozzle support 93 is in surface contact with the nozzle flange 92 at the rear of the nozzle flange 92, and supports the nozzle flange 92. The inner adapter 94 is a ring-shaped member disposed at the front of the nozzle flange 92 and the inner nozzle support 93, and the inner adapter 94 is ring-shaped around the central axis of the turbine 7. The inner adapter 94 is in surface contact with the nozzle flange 92 and the inner nozzle support 93.

Hereinafter, one transition structure is described as a representative example. In the description below, for the sake of convenience of the description, one side of the turbine 7 in its axial direction (the upstream side of the flow of the combustion gas) is referred to as the front side, and the other side of the turbine 7 in its axial direction (the downstream side of the flow of the combustion gas) is referred to as the rear side.

Figure 3:
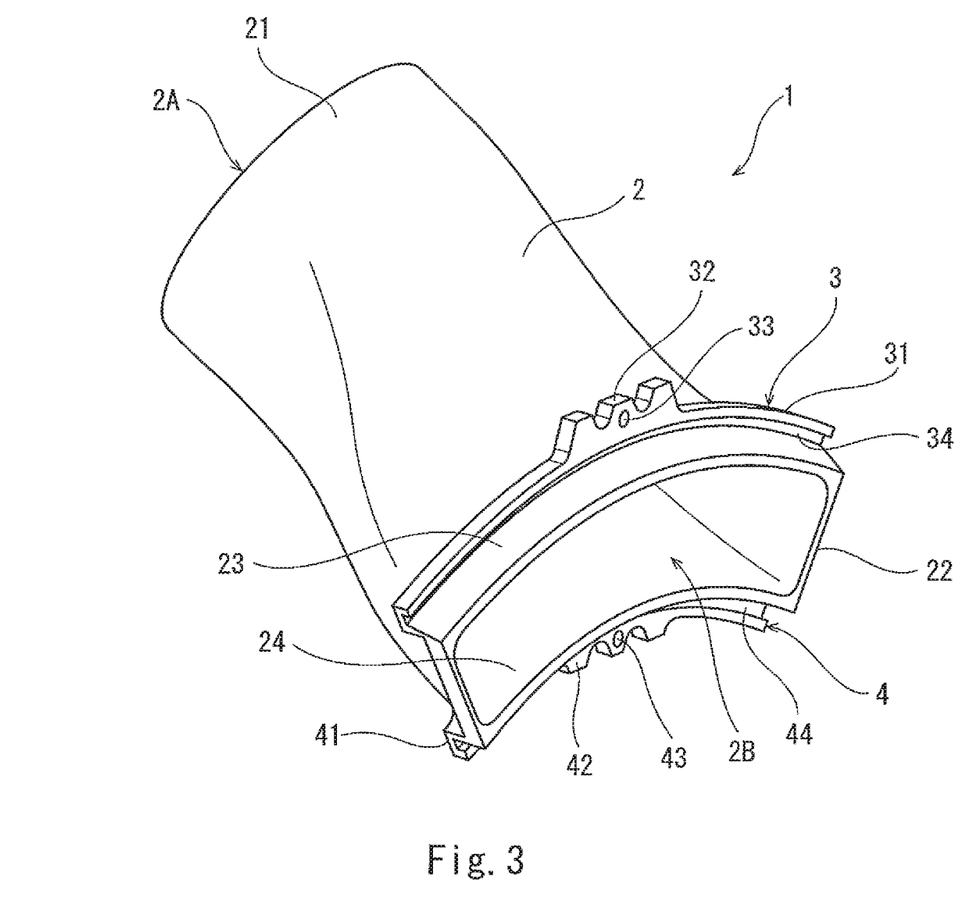
FIG. 3 is a perspective view of a transition piece.

As shown in FIG. 1 and FIG. 3, the duct 2 of the transition piece 1 includes a circular inlet 2A at an upstream end 21 and an arc-shaped outlet 2B at a downstream end 22. The duct 2 is also provided with: an outer flange 3, which protrudes from the downstream end 22 to the external diameter side of the arc-shaped outlet 2B; and an inner flange 4, which protrudes from the downstream end 22 to the internal diameter side of the arc-shaped outlet 2B.

As shown in FIG. 2, an outer arc wall 23 of the duct 2, the outer arc wall 23 being positioned at the external diameter side of the arc-shaped outlet 2B, forms a continuous wall surface together with the outer shroud 81 of the first-stage turbine nozzle 70, and an inner arc wall 24 of the duct 2, the inner arc wall 24 being positioned at the internal diameter side of the arc-shaped outlet 2B, forms a continuous wall surface together with the inner shroud 91 of the turbine nozzle 70.

The aforementioned outer adapter 84 is interposed between the outer flange 3 and the nozzle flange 82, such that the outer adapter 84 is in surface contact also with the outer flange 3. Similarly, the aforementioned inner adapter 94 is interposed between the inner flange 4 and the nozzle flange 92, such that the inner adapter 94 is in surface contact also with the inner flange 4.

The rear surface of the outer flange 3 is, at its root portion, provided with a groove 34 extending along the outer arc wall 23 of the duct 2 while the front surface of the outer adapter 84 is, at its inner peripheral portion, provided with an annular protrusion 85 fitted in the groove 34. Similarly, the rear surface of the inner flange 4 is, at its root portion, provided with a groove 44 extending along the inner arc wall 24 of the duct 2 while the front surface of the inner adapter 94 is, at its outer peripheral portion, provided with an annular protrusion 95 fitted in the groove 44.

The outer flange 3 and the inner flange 4 are positioned upstream of the arc-shaped outlet 2B. Accordingly, the inner peripheral surface of the outer adapter 84 faces the outer arc wall 23 of the duct 2, and the outer peripheral surface of the inner adapter 94 faces the inner arc wall 24 of the duct 2.

To be more specific, the outer flange 3 includes: a rim 31 extending along the outer arc wall 23 of the duct 2; and a lug 32 further protruding from the center of the rim 31. A positioning hole 33 is formed in the center of the lug 32. A positioning pin 61 is inserted in the positioning hole 33, and the positioning pin 61 determines the position of the outer flange 3 relative to the outer adapter 84.

Similarly, the inner flange 4 includes: a rim 41 extending along the inner arc wall 24 of the duct 2; and a lug 42 further protruding from the center of the rim 41. A positioning hole 43 is formed in the center of the lug 42. A positioning pin 62 is inserted in the positioning hole 43, and the positioning pin 62 determines the position of the inner flange 4 relative to the inner adapter 94.

An outer boss 51 protruding to the external diameter side of the arc-shaped outlet 2B of the duct 2, and an inner boss 53 protruding to the internal diameter side of the arc-shaped outlet 2B, are provided at the center of the rear end of the piece cover 5. The outer flange 3 of the transition piece 1 is sandwiched between the outer boss 51 and the turbine 7, and the inner flange 4 of the transition piece 1 is sandwiched between the inner boss 53 and the turbine 7.

Figure 4:
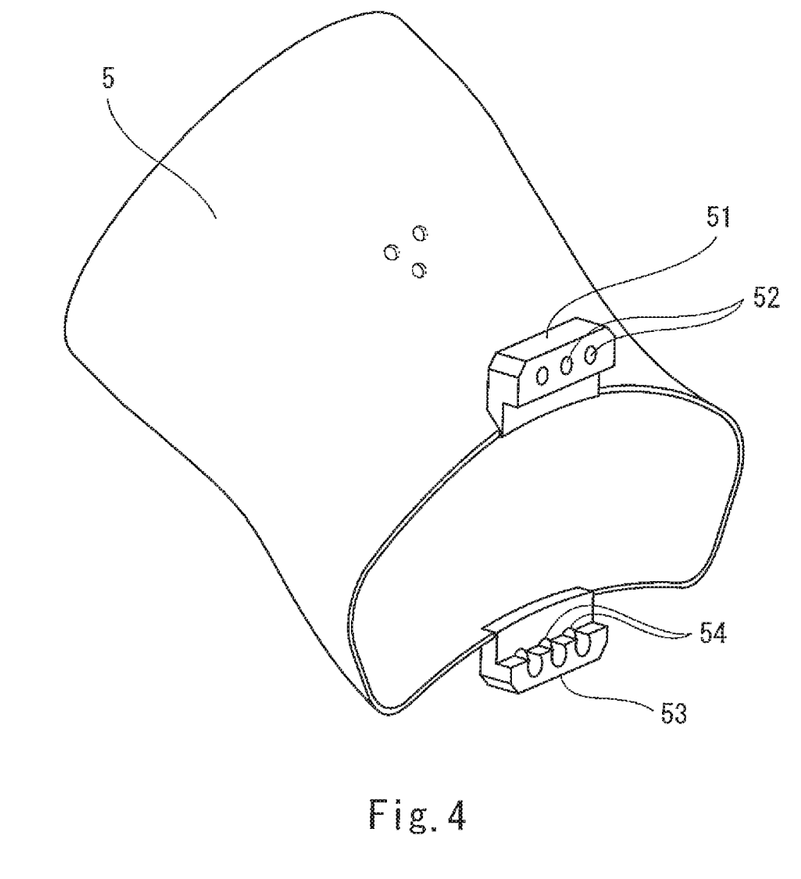
FIG. 4 is a perspective view of a piece cover.

In the present embodiment, as shown in FIG. 4, the outer boss 51 has a substantially L-shaped cross section, such that the outer boss 51 covers the front surface and the distal end surface of the lug 32 of the outer flange 3, and the inner boss 53 has a substantially L-shaped cross section, such that the inner boss 53 covers the front surface and the distal end surface of the lug 42 of the inner flange 4.

Specifically, the outer boss 51 has a width that is about the same as the width of the lug 32 of the outer flange 3, and is in contact with the outer adapter 84 over the lug 32. In other words, the outer adapter 84 is interposed between the outer boss 51 and the outer nozzle support 83, such that the outer adapter 84 is in surface contact also with the outer boss 51.

Similarly, the inner boss 53 has a width that is about the same as the width of the lug 42 of the inner flange 4, and is in contact with the inner adapter 94 over the lug 42. In other words, the inner adapter 94 is interposed between the inner boss 53 and the inner nozzle support 93, such that the inner adapter 94 is in surface contact also with the inner boss 53.

The outer boss 51 is provided with three screw holes 52. Alternatively, the number of screw holes 52 may be one or two. Bolts B are screwed in the screw holes 52 from the rear side, penetrating the outer nozzle support 83 and the outer adapter 84. In other words, the piece cover 5 is fixed to the turbine 7 by the bolts B in a state where the outer flange 3 is sandwiched between the piece cover 5 and the turbine 7.

Similarly, the inner boss 53 is provided with three screw holes 54. Alternatively, the number of screw holes 54 may be one or two. Bolts B are screwed in the screw holes 54 from the rear side, penetrating the inner nozzle support 93 and the inner adapter 94. In other words, the piece cover 5 is fixed to the turbine 7 by the bolts B in a state where the inner flange 4 is sandwiched between the piece cover 5 and the turbine 7.

Further, in the present embodiment, the outer adapter 84 is provided with a cooling hole 86, which penetrates the outer adapter 84 in the radial direction. That is, the cooling hole 86 leads the compressed air discharged into the aforementioned convention chamber to the outer arc wall 23 of the duct 2, the compressed air having a lower temperature than the combustion gas.

As described above, in the transition structure of the present embodiment, the transition piece 1 and the piece cover 5 are fixed to the turbine 7 by the same bolts B. This makes it possible to simplify the assembling work.

Further, in the present embodiment, the outer boss 51 and the inner boss 53 are in contact with the turbine 7 over the outer flange 3 and the inner flange 4, respectively. According to this configuration, the height of each of the outer flange 3 and the inner flange 4 can be made low such that the outer flange 3 and the inner flange 4 do not reach the bolts B, and thus the outer flange 3 and the inner flange 4 can be made small in size. In addition, since the lug 32 of the outer flange 3 is covered by the outer boss 51 and the lug 42 of the inner flange 4 is covered by the inner boss 53, blowing of the compressed air, which is discharged from the compressor into the convention chamber, against the outer flange 3 and the inner flange 4 is reduced. Consequently, cooling of the outer flange 3 and the inner flange 4 by the compressed air is suppressed, and thereby thermal stress occurring at the root portion of each of the outer flange 3 and the inner flange 4 can be reduced.

Still further, in the present embodiment, at the front of the outer adapter 84, the outer adapter 84 is in surface contact with the outer flange 3 and the outer boss 51, and at the rear of the outer adapter 84, the outer adapter 84 is in surface contact with the nozzle flange 82 and the outer nozzle support 83. Also, at the front of the inner adapter 94, the inner adapter 94 is in surface contact with the inner flange 4 and the inner boss 513, and at the rear of the inner adapter 94, the inner adapter 94 is in surface contact with the nozzle flange 92 and the inner nozzle support 93. According to this configuration, high sealing performance can be obtained at both sides of each of the outer adapter 84 and the inner adapter 94.

In addition, since the bolts B penetrate the outer nozzle support 83 and the outer adapter 84, the axial force of the bolts B can be applied between the outer adapter 84 and each of the outer flange 3 and the outer boss 51, and also between the outer adapter 84 and each of the nozzle flange 82 and the outer nozzle support 83. This makes it possible to obtain higher sealing performance at both sides of the outer adapter 84. Similarly, since the bolts B penetrate the inner nozzle support 93 and the inner adapter 94, the axial force of the bolts B can be applied between the inner adapter 94 and each of the inner flange 4 and the inner boss 53, and also between the inner adapter 94 and each of the nozzle flange 92 and the inner nozzle support 93. This makes it possible to obtain higher sealing performance at both sides of the inner adapter 94.

In the present embodiment, since the outer adapter 84 is provided with the cooling hole 86, the duct 2 can be cooled even at the downstream side of the outer flange 3 of the transition piece 1 by using the compressed air discharged from the compressor into the convention chamber.

(Variations)

The present invention is not limited to the above-described embodiment. Various modifications can be made without departing from the spirit of the present invention.

For example, the turbine 7 need not include the outer adapter 84, and the outer nozzle support 83 may protrude over the nozzle flange 82, such that the outer nozzle support 83 is in surface contact with the outer flange 3 and the outer boss 51. Similarly, the turbine 7 need not include the inner adapter 94, and the inner nozzle support 93 may protrude over the nozzle flange 92, such that the inner nozzle support 93 is in surface contact with the inner flange 4 and the inner boss 53.

It is not essential that the piece cover 5 be provided with both the outer boss 51 and the inner boss 53. Alternatively, the piece cover 5 may be provided with only one of the outer boss 51 and the inner boss 53. In other words, only one of the outer flange 3 and the inner flange 4 may be sandwiched between the boss and the turbine 7.

For example, in a case where the piece cover 5 is provided with only the inner boss 53, the nozzle flange 92 of the inner shroud 91 of the turbine nozzle 70 may be provided with screw holes, and the bolts B may be screwed in the screw holes from the front side, penetrating the inner boss 53 and the inner adapter 94.

The outer boss 51 and the inner boss 53 may be provided with through-holes instead of the screw holes 52 and 54, and nuts to be screwed with the bolts B may be disposed at the front of the outer boss 51 and the inner boss 53.

The cooling hole 86 may be formed in the inner adapter 94 such that the cooling hole 86 penetrates the inner adapter 94 in the radial direction.

Figure 5:
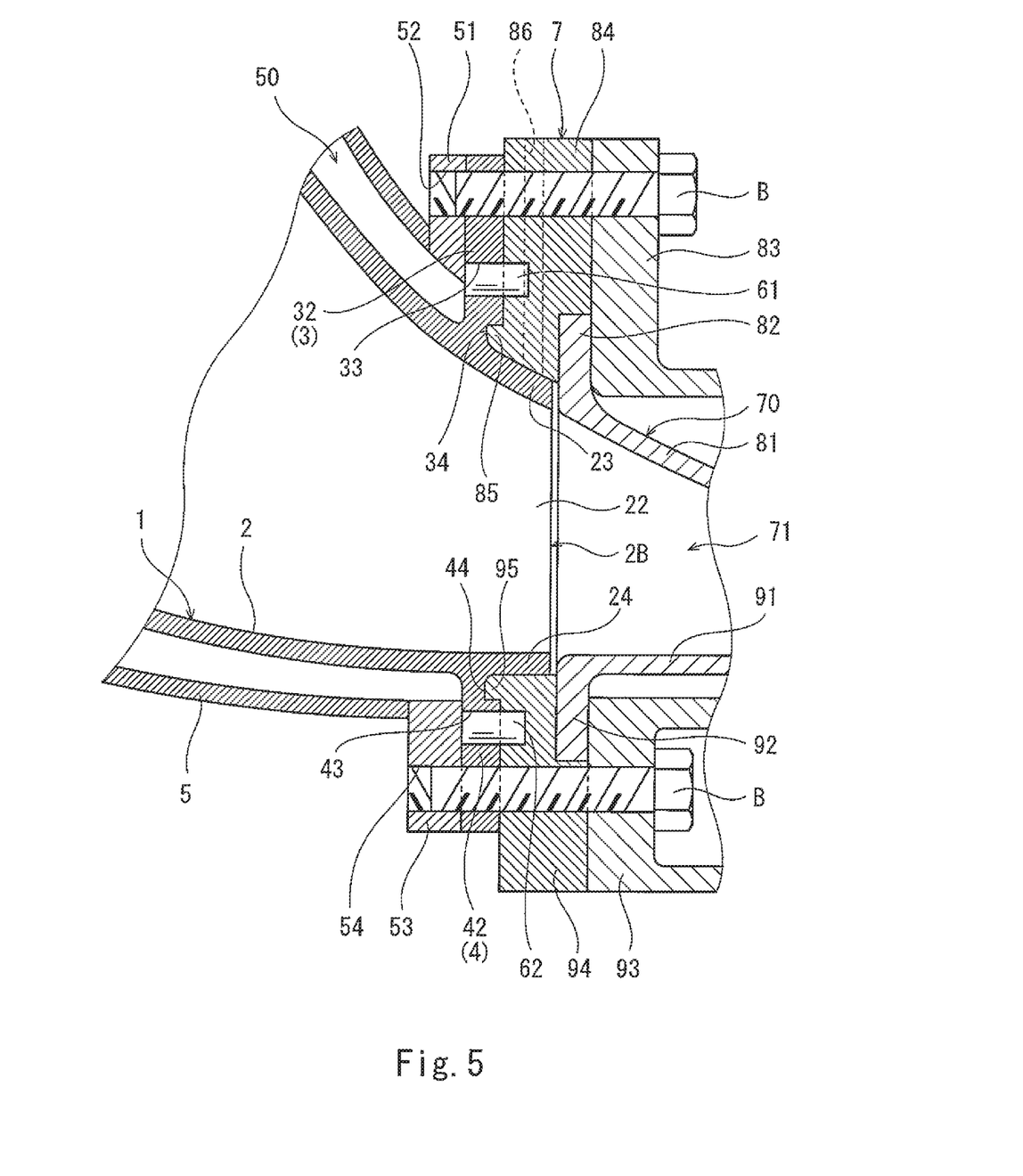
FIG. 5 is a sectional view of the transition structure according to one variation.

It is not essential that the outer boss 51 and the inner boss 53 be in contact with the turbine 7. For example, as shown in FIG. 5, the size of the lug 32 of the outer flange 3 may be increased, and the outer boss 51 may be plate-shaped and parallel to the lug 32. Similarly, the size of the lug 42 of the inner flange 4 may be increased, and the inner boss 53 may be plate-shaped and parallel to the lug 42.

The lug 32 of the outer flange 3 may be eliminated; two outer bosses 51 may be provided on both ends at the rear end of the piece cover 5; and both ends of the rim 31 may be sandwiched between the turbine 7 and these outer bosses 51. Similarly, the lug 42 of the inner flange 4 may be eliminated; two inner bosses 53 may be provided on both ends at the rear end of the piece cover 5; and both ends of the rim 41 may be sandwiched between the turbine 7 and these inner bosses 53.

REFERENCE SIGNS LIST 1 transition piece
2 duct
2B arc-shaped outlet
22 downstream end
23 outer arc wall
24 inner arc wall
3 outer flange
4 inner flange
5 piece cover
51, 53 boss
52, 54 screw hole
7 turbine
70 turbine nozzle
82 nozzle flange
83 outer nozzle support
84 outer adapter
86 cooling hole
92 nozzle flange
93 inner nozzle support
94 inner adapter
B bolt

The invention claimed is:

1. A transition structure between a combustor and a turbine in a gas turbine, the transition structure comprising:
    a transition piece including a duct and a flange protruding from a downstream end of the duct; and
    a piece cover surrounding the duct, wherein
    the piece cover includes a boss that is fixed to the turbine by a bolt in a state where the flange is sandwiched between the boss and the turbine, the boss being in contact with the turbine over the flange, and
    the turbine includes:
        a turbine nozzle including a nozzle flange;
        a nozzle support that supports the nozzle flange; and
        an adapter interposed between the nozzle flange and the flange of the transition piece such that the adapter is in surface contact with the nozzle flange and the flange of the transition piece, and interposed between the nozzle support and the boss such that the adapter is in surface contact with the nozzle support and the boss, the adapter being ring-shaped around a central axis of the turbine.

2. The transition structure according to claim 1, wherein the bolt penetrates the nozzle support and the adapter.

3. The transition structure according to claim 1, wherein the flange of the transition piece is positioned upstream of an arc-shaped outlet of the duct,
    the adapter faces an arc wall of the duct, the arc wall being positioned at an external diameter side or an internal diameter side of the arc-shaped outlet, and
    the adapter is provided with a cooling hole that penetrates the adapter in a radial direction.

4. The transition structure according to claim 1, wherein the flange of the transition piece is at least one of an outer flange and an inner flange, the outer flange protruding from the downstream end of the duct to an external diameter side of an arc-shaped outlet of the duct, the inner flange protruding from the downstream end of the duct to an internal diameter side of the arc-shaped outlet.

5. The transition structure according to claim 2, wherein the flange of the transition piece is positioned upstream of an arc-shaped outlet of the duct,
    the adapter faces an arc wall of the duct, the arc wall being positioned at an external diameter side or an internal diameter side of the arc-shaped outlet, and
    the adapter is provided with a cooling hole that penetrates the adapter in a radial direction.

6. The transition structure according to claim 2, wherein the flange of the transition piece is at least one of an outer flange and an inner flange, the outer flange protruding from the downstream end of the duct to an external diameter side of an arc-shaped outlet of the duct, the inner flange protruding from the downstream end of the duct to an internal diameter side of the arc-shaped outlet.

7. The transition structure according to claim 3, wherein the flange of the transition piece is at least one of an outer flange and an inner flange, the outer flange protruding from the downstream end of the duct to an external diameter side of an arc-shaped outlet of the duct, the inner flange protruding from the downstream end of the duct to an internal diameter side of the arc-shaped outlet.

* * * * *